(12) United States Patent
Szczeszynski et al.

(10) Patent No.: US 8,503,203 B1
(45) Date of Patent: Aug. 6, 2013

(54) PRE-CHARGE OF SWITCHED CAPACITOR CIRCUITS WITH CASCODED DRIVERS

(71) Applicant: Arctic Sand Technologies, Inc., Cambridge, MA (US)

(72) Inventors: Gregory Szczeszynski, Hollis, NH (US); David Guiliano, Brookline, MA (US); Raymond Barrett, Jr., Merrimack, NH (US)

(73) Assignee: Arctic Sand Technologies, Inc., Cambridge, MA (US)

( * ) Notice: Subject to any disclaimer, the term of this patent is extended or adjusted under 35 U.S.C. 154(b) by 0 days.

(21) Appl. No.: 13/652,835

(22) Filed: Oct. 16, 2012

(51) Int. Cl.
*H02M 3/18* (2006.01)
*G05F 1/10* (2006.01)

(52) U.S. Cl.
USPC .............................. 363/60; 327/356; 307/110

(58) Field of Classification Search
USPC ............. 363/59, 60; 327/536, 537; 307/110, 307/113, 125
See application file for complete search history.

(56) References Cited

U.S. PATENT DOCUMENTS

| | | | | |
|---|---|---|---|---|
| 7,724,551 B2 * | 5/2010 | Yanagida et al. | ................ | 363/60 |
| 7,999,601 B2 * | 8/2011 | Schlueter et al. | ............. | 327/383 |
| 8,040,174 B2 * | 10/2011 | Likhterov | ..................... | 327/536 |
| 8,159,091 B2 * | 4/2012 | Yeates | ........................... | 307/110 |

\* cited by examiner

*Primary Examiner* — Matthew Nguyen
(74) *Attorney, Agent, or Firm* — Occhiuti Rohlicek & Tsao LLP

(57) ABSTRACT

An apparatus for voltage conversion includes a switched capacitor circuit, a pre-charge circuit, a voltage divider stage, and a driver stage. The switched capacitor circuit has pump capacitors to transfer energy and a steady-state operating mode and a pre-charge mode. The pre-charge circuit initially charges the pump capacitors when the switched capacitor circuit operates in the pre-charge mode. It includes a voltage divider stage having one or more nodes, each of which provides voltage at one of a corresponding one or more voltage levels, and a driver stage having one or more cascoded drivers, each of which comprises a first terminal for receiving a drive signal that depends at least in part on a voltage level at a corresponding one of the nodes, and a second terminal for coupling to a pump capacitor and to another of the drivers.

23 Claims, 14 Drawing Sheets

PRE-CHARGE OF SWITCHED CAPACITOR CIRCUITS WITH CASCODED DRIVERS

FIELD OF DISCLOSURE

This invention relates to switched capacitor (SC) circuits, such as charge pumps.

BACKGROUND

In steady-state operation of a charge pump, one often exposes pump switches in the charge pump to voltage stresses. These voltage stresses depend on the design of the charge pump and its output voltage. In general, it is desirable to reduce the maximum voltage stress on the FETs that are typically used as pump switches in a charge pump.

One type of charge pump is a series-parallel charge pump 11, an example of which is shown in FIG. 1. The particular embodiment shown, which is a 1:5 step-down charge pump, exposes three pump switches SW00, SW10, SW14 to a maximum voltage stress of four times the output voltage Vout.

Another type of charge pump is a Dickson charge pump 14, an example of which is shown in FIG. 2. For comparison with the series-parallel charge pump 11 shown in FIG. 1, the particular embodiment shown is also in a 1:5 step-down configuration. The Dickson charge pump 14 features four pump capacitors 20A-20D and five interconnecting pump switches 22A-22E, with the first pump switch 22A accepting an input voltage Vin from a voltage source 12 and the last pump switch 22E providing an output voltage Vout to a load 17. Without loss of generality, the load 17 is modeled as a load resistance RL and load capacitance CL in parallel.

An advantage of the Dickson pump 14 is that during steady-state operation, the maximum voltage stress on any one pump switch 22A-22E is only twice the output voltage Vout, not four times the output voltage Vout as was the case with the series-parallel charge pump 11. As a result, the pump switches 22A-22E can be lower voltage rated switches.

However, although the pump switches 22A-22E in a Dickson charge pump 14 experience only modest voltage stresses during operation in steady-state mode, there is still the problem of transient voltage stress across the pump switches during start-up. Such transient voltage stresses can exceed voltage stresses that occur during steady-state operation. To avoid losing the benefit of the Dickson configuration, the initial charging of the pump capacitors 20A-20D is preferably carried out prior to steady-state operation in a way that avoids imposing excess voltage stress on any pump switch 22A-22E. This problem is addressed by a pre-charge circuit 15A shown in FIG. 2.

The illustrated pre-charge circuit 15A includes stacked resistors R0-R4 connected to the pump capacitors 20A-20D. During a pre-charge interval that begins when the input voltage Vin rises from zero volts to its final voltage value, the stacked resistors R0-R4 pre-charge those pump capacitors 20A-20D. The duration of this pre-charge interval depends on a time constant associated with the resistance of the stacked resistors R0-R4 and the capacitance of the pump capacitors 20A-20D.

If the input voltage Vin is ramped up faster than the time constant associated with the pre-charge circuit 15A then the pump switches 22A-22E may be damaged. To avoid voltage stress on the pump switches 22A-22E during this pre-charge interval, it is useful to provide a disconnection switch SWD that is rated to accommodate the input voltage Vin. The disconnection switch SWD isolates the pump switches 22A-22E during the pre-charge interval. Consequently, during the pre-charge interval, the disconnection switch SWD is opened to isolate the pump switches 22A-22E from the input voltage Vin. Then, when the pump capacitors 20A-20D are charged, the disconnection switch SWD is closed and steady-state operation begins.

SUMMARY

The disconnection switch SWD is a large high-voltage switch that is not needed most of the time. As such, it would be desirable to omit it altogether from the pre-charge circuit 15A. The invention is based on the recognition of a way to avoid the need to use a disconnection switch for pre-charging a Dickson charge pump.

In one aspect, the invention features an apparatus for voltage conversion. Such an apparatus includes a switched capacitor circuit, a pre-charge circuit, a voltage divider stage, and a driver stage. The switched capacitor circuit has pump capacitors to be charged and a steady-state operating mode and a pre-charge mode. The pre-charge circuit initially charges the pump capacitors when the switched capacitor circuit operates in the pre-charge mode. It includes a voltage divider stage having one or more nodes, each of which provides voltage at one of a corresponding one or more voltage levels, and a driver stage having one or more cascoded drivers, each of which includes a first terminal for receiving a drive signal that depends at least in part on a voltage level at a corresponding one of the nodes, and a second terminal for coupling to a pump capacitor and to another of the drivers.

In another aspect, the invention features an apparatus for voltage conversion. Such an apparatus includes a switched capacitor circuit, a pre-charge circuit, a voltage divider stage, and a driver stage. The switched capacitor circuit has pump capacitors and a steady-state operating mode and a pre-charge mode. The pre-charge circuit initially charges the pump capacitors when the switched capacitor circuit operates in the pre-charge mode. It includes a voltage divider stage having first and second nodes, the first node providing a voltage at a first voltage level and the second node providing a voltage at a second voltage level, and a driver stage having one or more cascoded drivers, each of which includes a first terminal for receiving a drive signal that depends at least in part on a voltage level at a corresponding one of the nodes, and a second terminal for coupling to a pump capacitor and to another of the drivers.

In one embodiment, the voltage divider stage includes a pair of adjacent resistors in series and a node is defined by that pair of adjacent resistors in series.

In another embodiment, the driver stage includes one or more FETs, each of which has a gate, a source, and a drain, with the source being connected to the pump capacitor and to a drain of another of the FETs.

Yet another embodiment includes an additional switched capacitor circuit and an additional pre-charge circuit that operate out of phase relative to the switched capacitor circuit and the pre-charge circuit, wherein the additional switched capacitor circuit includes a switched capacitor circuit having pump capacitors, the switched capacitor circuit having a steady-state operating mode and a pre-charge mode, and wherein the additional pre-charge circuit includes a voltage divider stage having a first node and a second node, wherein the first node provides a voltage at a first level and the second node provides a voltage at a second level, and a driver stage having one or more cascoded drivers, each of which includes a first terminal for receiving a drive signal that depends at least in part on a voltage level at a corresponding one of the nodes, and a second terminal for coupling to a pump capacitor and to another of the drivers, wherein the switched capacitor circuit, the pre-charge circuit, the additional switched capacitor circuit, and the additional pre-charge circuit cooperate to deliver energy to a load.

Other embodiments include those in which the driver stage includes a FET and those in which the driver stage includes a BJT.

Also among the embodiments are those in which the driver stage includes one or more BJTs (bipolar junction transistors), each of which has a base, a collector, and an emitter, wherein the emitter is connected to the pump capacitor and to a collector of another of the BJTs.

In some embodiments, the drivers have different current ratings. In other embodiments, the switched capacitor circuit includes a Dickson charge pump. Among these embodiments are those in which the drivers comprise pump switches used by the Dickson charge pump during steady-state operating mode.

Additional embodiments include those in which the first terminal for receiving a drive signal is connected directly to a node.

Yet other embodiments also include one or more amplifiers, each having an output connected to a first terminal of a corresponding one of the drivers, a first input connected to a corresponding one of the nodes, and a second input connected to a second terminal of the driver.

Additional embodiments include one or more PMOS followers, each having a source terminal connected to a first terminal of a corresponding one of the drivers, and a gate terminal connected to a corresponding one of the nodes.

Yet other embodiments are those in which during a first portion of the pre-charge mode, the voltage divider stage includes nodes that define voltage levels that are equally spaced from each other, and during a second portion of the pre-charge mode, the voltage divider stage includes nodes that define voltage levels that are unequally spaced from each other.

Also included among the embodiments are those in which during a first time interfal, voltage divider stage includes nodes that define a first set of voltage levels and during a second time interval, the voltage divider stage includes nodes that define a second set of voltage levels.

Among other embodiments are those in which the voltage divider stage includes one or more resistors in series for dividing a voltage into one or more levels, and a Zener diode in series with the series resistors.

In another aspect, the invention features an apparatus for pumping charge. Such an apparatus includes a switched capacitor circuit having pump capacitors. The switched capacitor circuit has a steady-state operating mode and a pre-charge mode. The apparatus also includes a pre-charge circuit for initially charging the pump capacitors when the switched capacitor circuit operates in the pre-charge mode. The pre-charge circuit includes a voltage divider stage having a plurality of nodes, each of which provides voltage at one of a corresponding plurality of voltage levels, and a driver stage having a plurality of cascoded drivers, each of which comprises a first terminal for receiving a drive signal that depends at least in part on a voltage level at a corresponding one of the nodes, and a second terminal for coupling to a pump capacitor and to another of the drivers.

In some embodiments, the voltage divider stage comprises a plurality of resistors in series. In these embodiments, each of the nodes is defined by a pair of adjacent resistors.

In another aspect, the invention features an apparatus for providing a voltage. Such an apparatus includes a pre-charging circuit including a first stage and a second stage. The first stage includes one or more nodes, each of which provides voltage at one of a corresponding one or more voltage levels. The second stage includes a driver set including one or more cascoded drivers. At least one driver from the driver set includes a first terminal and a second terminal. The first terminal is configured for receiving a drive signal that depends at least in part on a voltage level at a corresponding one of the nodes. The second terminal is configured for coupling to another driver from the set and to a capacitor in a circuit to be pre-charged.

Some embodiments also include a switched capacitor circuit having at least one capacitor, the at least one capacitor being coupled to the second terminal. In some of these embodiments, the switched capacitor circuit is a Dickson charge pump.

Other embodiments also include power converter having at least one capacitor, the at least one capacitor being coupled to the second terminal.

Also among the embodiments are those that also include a multilevel buck converter having at least one capacitor, the at least one capacitor being coupled to the second terminal.

Also among the embodiments are those in which the first stage includes one or more resistors in series, with each of the nodes being defined by a pair of adjacent resistors.

In yet other embodiments, the second stage includes one or more transistors, each of which has a first terminal, a second terminal, and a third terminal, wherein the first terminal controls current between the second and third terminals, the second terminal being connected to a third terminal of another transistor and to a capacitor to be pre-charged.

Any of the foregoing embodiments can also include a control circuit for controlling the switching of capacitors.

These and other features of the invention will be apparent from the following description and the accompanying figures in which:

DETAILED DESCRIPTION

The known pre-charge 15A circuit can either be designed to track the voltage source 12 quickly through the use of small resistors R0-R4 or slowly through the use of large resistors R0-R4. Both approaches reduce the efficiency of the Dickson charge pump 14, though for different reasons. Small resistors drain charge from the pump capacitors 20A-20D during steady-state operation, resulting in a lower efficiency. Large resistors require the use of a disconnection switch SWD during the pre-charge interval, which also results in a lower efficiency.

Figure 3:
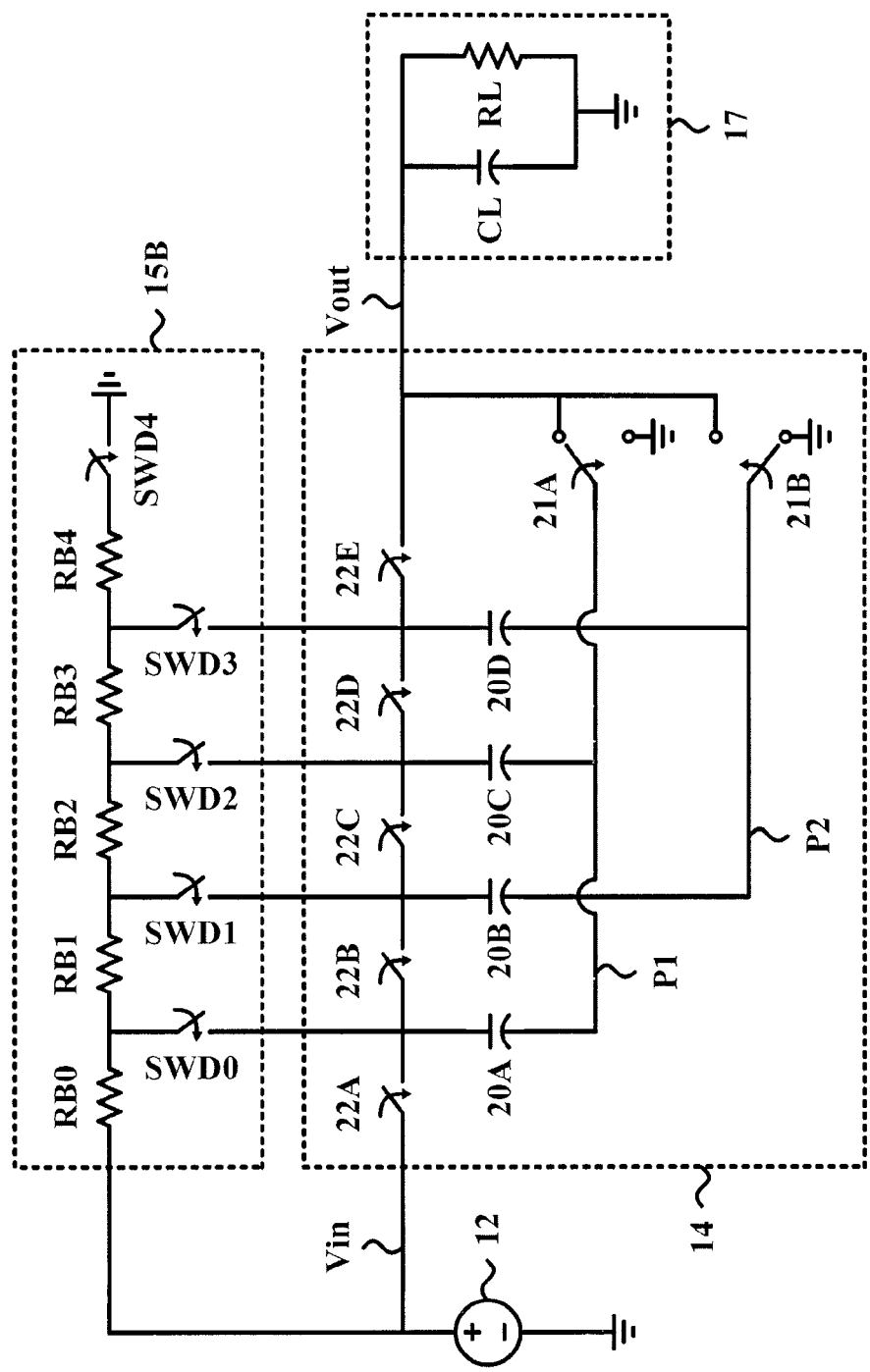
FIG. 3 is a Dickson charge pump with an alternative pre-charge circuit.

One possible solution, illustrated in FIG. 3, is to use small resistors, but to disconnect the pre-charge circuit 15B during steady-state operation with switches SWD0-SWD4. Unfortunately, the switches SWD0-SWD4 need to block high voltage. For example, switch SWD4 is required to be rated to block the input voltage Vin.

Another solution uses low voltage transistors. In one embodiment, illustrated in FIG. 4, a 1:5 step-down Dickson charge pump 14 includes a pre-charge circuit 10A. In the remaining description of FIG. 4, the charge pump 14 is assumed to be connected to a 20-volt source 12 and to provide an output voltage Vout of 4 volts to a load 17. In the charge pump 14, pump capacitors 20A-20D are stacked in parallel with first and second pump nodes P1, P2. Conversely, the pump capacitors 20A-20D could have been stacked in series with the pump nodes P1, P2.

The charge pump 14 includes a first pump capacitor 20A connected by a first pump switch 22A to an input voltage source 12, a second pump capacitor 20B connected to the first pump capacitor 20A by a second pump switch 22B, a third pump capacitor 20C connected to the second pump capacitor 20B by a third pump switch 22C, and a fourth pump capacitor 20D connected to the third pump capacitor 20C by a fourth pump switch 22D and to a load 17 by a fifth pump switch 22E. The load 17 is modeled by a load capacitance CL and load resistance RL.

The charge pump 14 has two modes of operation: a pre-charge mode and a steady-state operating mode. As the input voltage Vin initially rises from zero volts to 20 volts, the charge pump 14 operates in its pre-charge mode. During the pre-charge mode, switches 21A-21B connect the first and second pump nodes P1, P2 to ground. Furthermore, all of the pump switches 22A-22E are open. By the end of the pre-charge mode, the positive terminals of the pump capacitors 20A, 20B, 20C, 20D will have been charged to 16 volts, 12 volts, 8 volts, and 4 volts, respectively.

After the pump capacitors 20A-20D have been charged, the charge pump 14 operates in its steady-state operating mode. During this mode, packages of charge are shuttled along the pump switches 22A-22E as the pump capacitors 20A-20D are successively charged and discharged at a specific frequency. During steady-state operation, the charge pump 14 transitions between two states. In the first state, the first node P1 connects to ground, the second node P2 connects to the output of the charge pump 14, pump switches 22A, 22C, 22E open, and pump switches 22B, 22D close. In the second state, the first node P1 connects to the output of the charge pump 14, the second node P2 connects to ground, pump switches 22A, 22C, 22E close, and pump switches 22B, 22D open. The maximum voltage stress on any one of the pump switches 22A-22E is twice the output voltage Vout.

Figure 1:
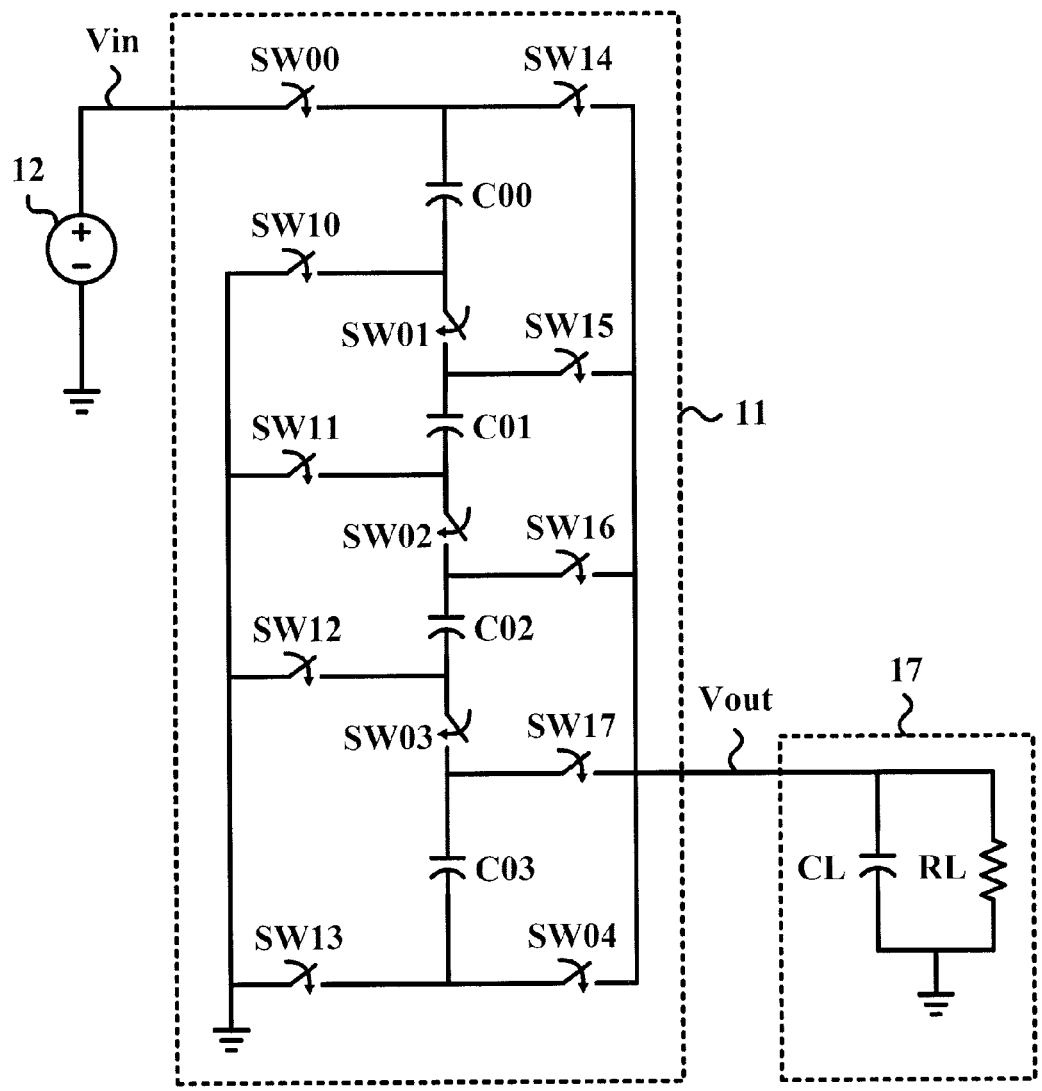
FIG. 1 is a prior art series-parallel step-down charge pump.
Figure 2:
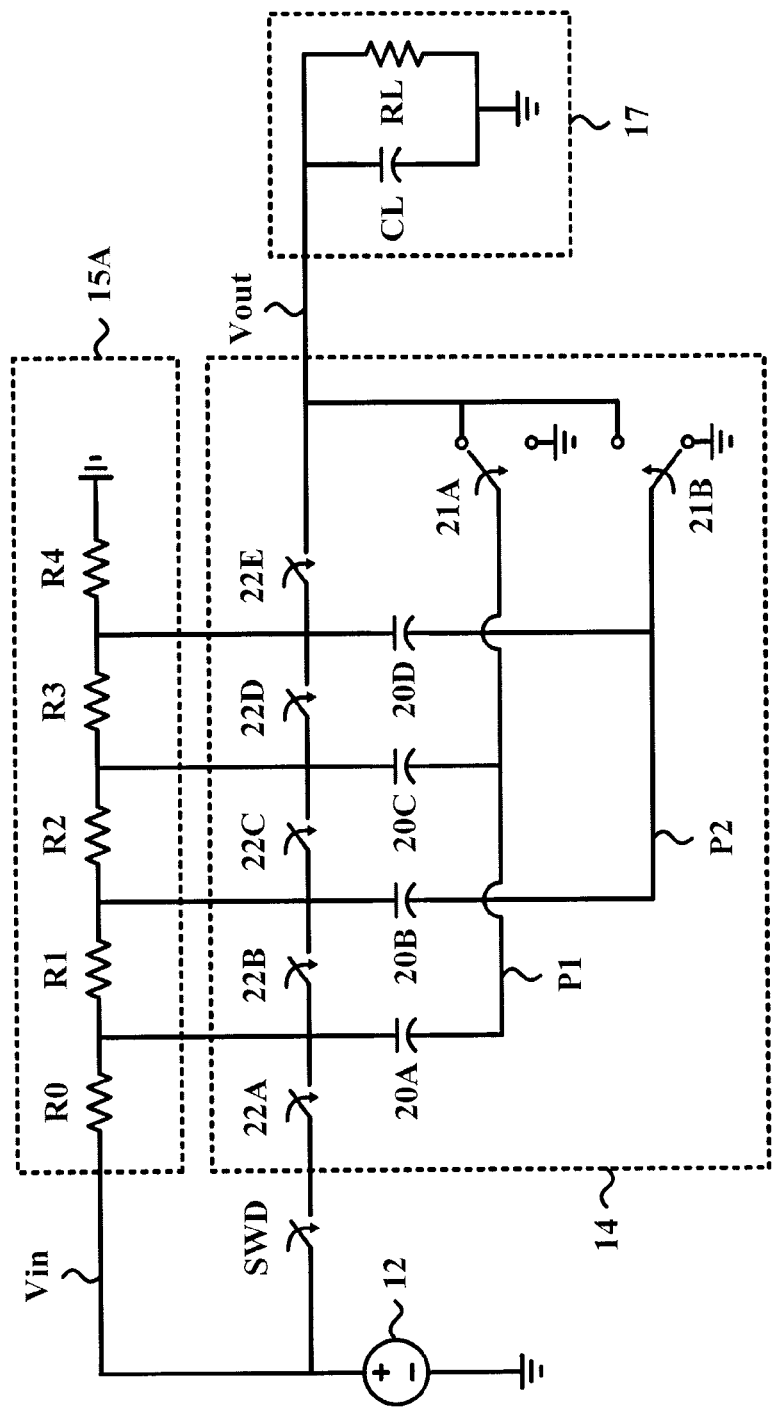
FIG. 2 is a prior art Dickson charge pump with a pre-charge circuit.

As long as the pre-charge circuit 10A is fast enough to keep up with changes in the input voltage Vin during the pre-charge mode, none of the pump switches 22A-22E experience a voltage stress greater than twice the output voltage Vout. Therefore, the charge pump 14 avoids the need for a disconnection switch analogous to the disconnection switch SWD shown in FIG. 2.

The pre-charge circuit 10A accepts an input voltage Vin from a voltage source 12 and uses that input voltage Vin to pre-charge the pump capacitors 20A-20D. The pre-charge circuit 10A features a passive voltage divider 16 to split the input voltage Vin into multiple levels and to output each of these levels to a driver stage 18 having cascoded drivers 28A-28D. The voltage divider stage features five resistors 26A-26E in series that collectively split the input voltage Vin into four voltage levels, one for each of the four drivers 28A-28D. These voltage levels will be referred to herein as the "target pre-charge voltages." The drivers 28A-28D ultimately provide current used for charging the pump capacitors 20A-20D.

The voltage at a first node, which is between the first and the second resistors 26A, 26B, provides a gate voltage Vg1 to a first NMOS FET that functions as the first driver 28A. Thus, as the input voltage Vin rises to 20 volts, the gate voltage Vg1 rises to 16 volts. Since the source voltage of an FET tends to track its gate voltage, the source voltage Vs1 of the first driver 28A also rises in step with the input voltage Vin to a value slightly less than 16 volts.

In the pre-charge mode, a first pump capacitor 20A to be charged has its first terminal grounded and its second terminal connected to the source of the first driver 28A. As a result, the first pump capacitor 20A sees a voltage difference equal to the source voltage Vg1 of the first driver 28A. This voltage difference serves to draw some of the current flowing from the source of the first driver 28A into the first pump capacitor 20A, thereby charging it. The remaining current proceeds into the drain of a second NMOS FET, which functions as the second driver 28B.

A voltage at a second node, which is between the second resistor 26B and the third resistor 26C, then drives the gate of this second driver 28B. The voltage at this second node rises to 12 volts in step with the input voltage Vin as the input voltage Vin rises to 20 volts. This causes the source voltage Vg2 at the second FET to rise to slightly less than 12 volts in step with the input voltage Vin. A second pump capacitor 20B is connected in the same way as the first pump capacitor 20A. As a result, some current is diverted into the second pump capacitor 20B. The remaining current proceeds into a third NMOS FET, which functions as the third driver 28C.

The operation of the third and fourth drivers 28C, 28D and their role in charging the remaining third and fourth pump capacitors 20C, 20D is as described above in connection with the first and second drivers 28A, 28B. This operation results in similar target pre-charge voltages for the third and fourth pump capacitors 20C, 20D.

In the driver stage 18, a particular driver 28B handles current to charge its own associated pump capacitor 20B as well as current being provided to a driver 28C to which it is connected by its source terminal. Thus, the second driver 28B can be sized smaller than the first driver 28A because the current that passes through the second driver 28B will have been depleted to charge the first pump capacitor 20A. Similarly, the third driver 28C can be sized smaller than the second driver 28B and the fourth driver 28D can be sized to be smaller than the third driver 28C.

Each driver 28A-28D is sized to handle a voltage difference that is at most the highest voltage between any pair of pump capacitors 20A-20D to be charged. In the embodiment shown in FIG. 4, each driver 28A-28D need only be sized to handle at most 8 volts. The drivers 28A-28D need not be implemented using NFETs. For example, PFETs, NPNs, and PNPs are suitable. In general, any device with input and output characteristics similar to those of an NFET is applicable.

In the embodiment shown in FIG. 4, the source voltage of each driver 28A-28D is slightly below the target pre-charge voltage presented at the gate terminal of each driver 28A-28D. If in steady-state operation, the pump capacitor voltage were to remain above this value, the pre-charge circuit 10A would neither interfere with nor undermine the efficiency of the charge pump 14. If this is not the case, the resistors 26A-26D in the passive voltage divider 16 can be adjusted to lower the target pre-charge voltages to appropriate values.

Another approach is to adjust the passive voltage divider 16 dynamically. For example, the target pre-charge voltages may be adjusted to one set of values in the pre-charge mode and then adjusted to another set of values during steady-state mode. This approach allows for the optimal target pre-charge voltages during the pre-charge mode while also ensuring that the pre-charge circuit 10A does not interfere with the steady-state operation of the charge pump 14.

As described above, the pre-charge circuit 10A shown in FIG. 4 provides the initial charging of the pump capacitors 20A-20D in the charge pump 14 without the need to provide a separate high-voltage disconnection switch between the charge pump 14 and the voltage source 12. The pre-charge circuit 10A achieves this by charging the pump capacitors 20A-20D as fast as the input voltage Vin ramps up.

Figure 4:
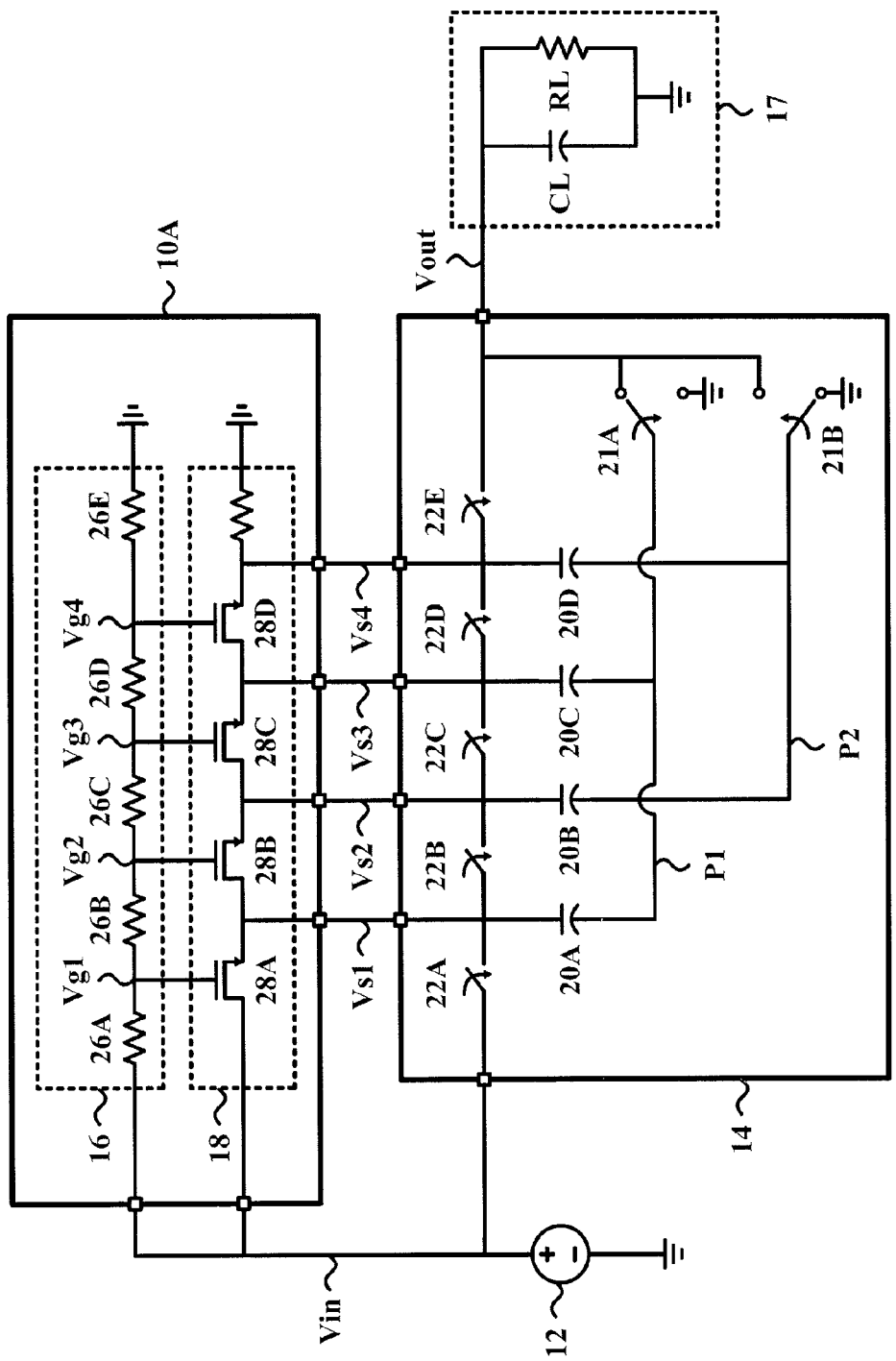
FIG. 4 is a Dickson charge pump with a cascoded driver pre-charge circuit.

In the embodiment shown in FIG. 4, as the input voltage Vin climbs to its final value, the passive voltage divider 16 establishes target voltages for each pump capacitor 20A-20D. These target voltages are provided to the gate terminals of the respective drivers 28A-28D. Ultimately, these target voltages at the gate terminals result in corresponding source voltages Vs1-Vs4 at the drivers 28A-28D. However, as a result of electrical properties inherent in a driver 28A-28D, there may be a small lag between that driver's source voltage Vs1-Vs4 and its gate voltage Vg1-Vg4.

Figure 5:
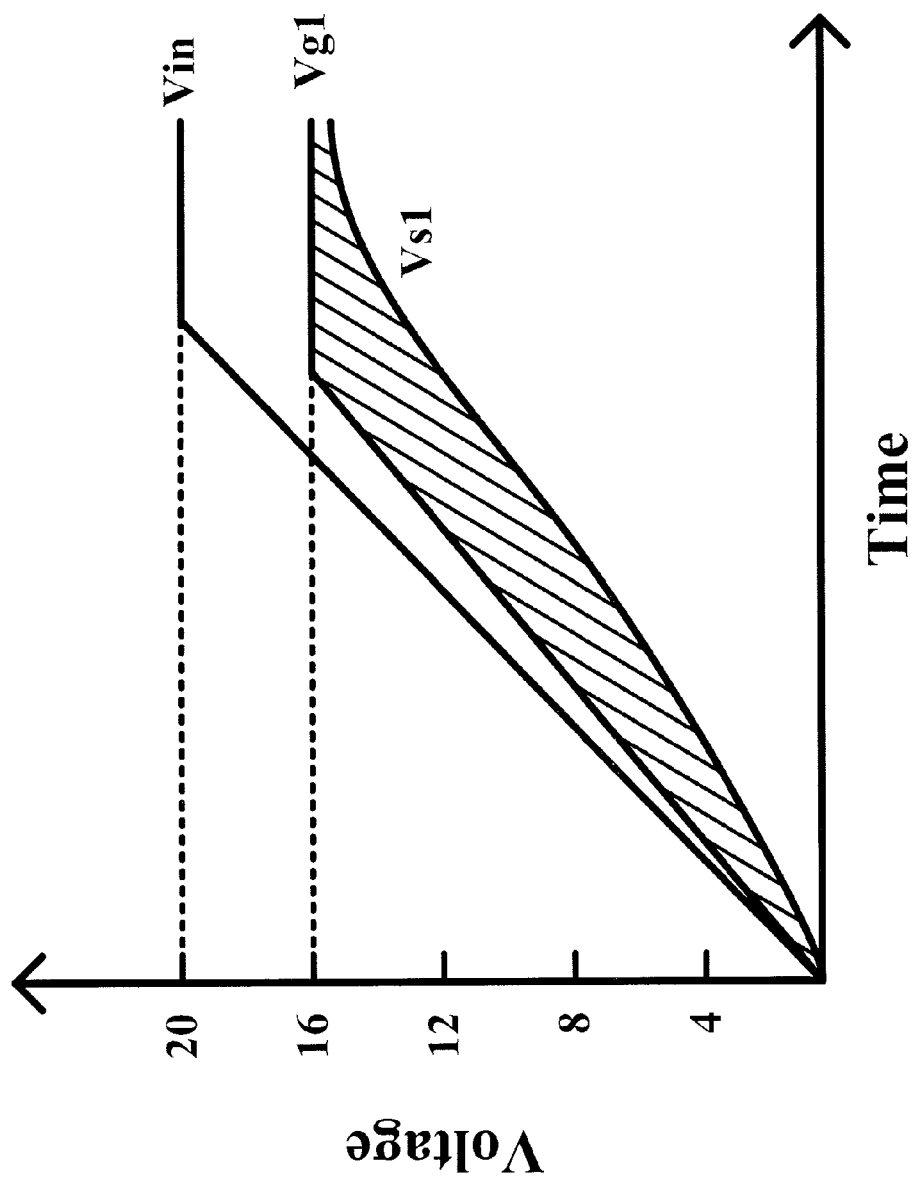
FIG. 5 illustrates lag between the source voltage and gate voltage at a driver from the pre-charge circuit shown in FIG. 4.

This lag is illustrated in FIG. 5, which shows the input voltage Vin, the gate voltage Vg1 of the first driver 28A, and the source voltage Vs1 of the first driver 28A. As the input voltage Vin increases linearly to its final value of 20 volts, the gate voltage Vg1 closely tracks the input voltage Vin. However, the source voltage Vs1 will tend to lag the gate voltage Vg1 as a result of internal resistance in the driver 28A. This lag is shown as the shaded area in FIG. 5.

To minimize this lag, the individual drivers 28A-28D are sized to quickly raise the pump capacitor voltages to these target values as soon as possible. This can be done, for example, by making a driver 28A physically larger to reduce its internal resistance.

Furthermore, it is possible to save area on a circuit, at the cost of additional complexity, by using the FETs that are already serving as pump switches 22A-22E within the Dickson charge pump 14 as the cascoding drivers 28A-28D in the driver stage 18. This is done by multiplexing the FET gates between the pre-charge circuit 10A and the charge pump 14.

In the preceding embodiment, the voltage at the source terminal of a driver 28A-28D will be slightly lower than the voltage at the gate terminal of a driver 28A-28D. To improve performance, it is desirable to correct this. One way to do so is to use a pre-driver, which can either be closed loop, open loop, or a combination of closed loop and open loop. The pre-driver ensures that the source voltage Vs1-Vs4 at each driver 28A-28D tracks the target pre-charge voltage. The pre-driver also provides a low impedance path to the driver 28A-28D. This reduces the RC time constant and allows the driver 28A-28D to track more quickly.

Figure 6:
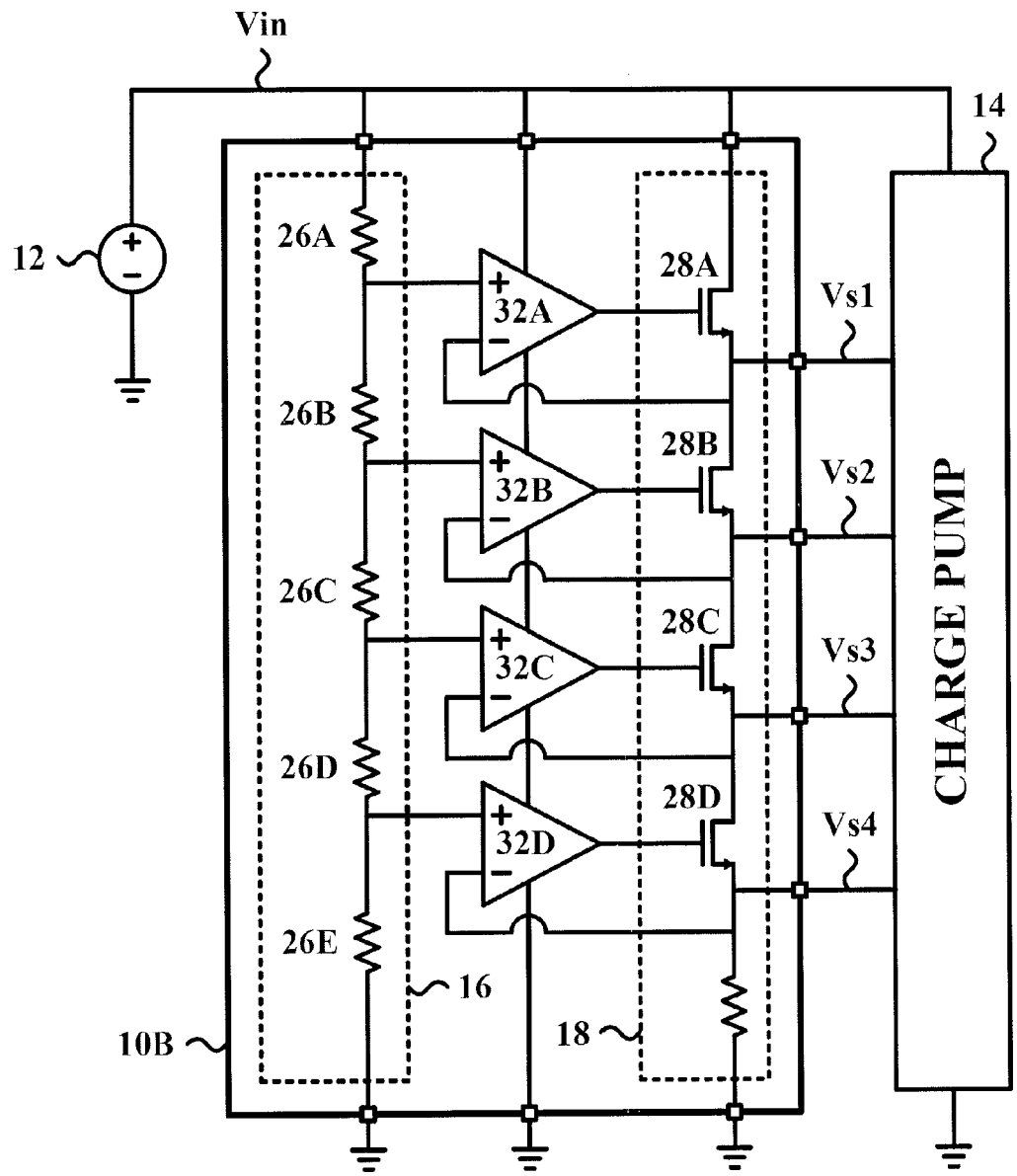
FIG. 6 shows an implementation of the pre-charge circuit with closed-loop pre-drivers.

A closed loop version of a pre-driver is shown in FIG. 6. The voltage at a node between adjacent resistors 26A-26B, 26B-26C, 26C-26D, 26D-26E of the passive voltage divider 16 is applied to a positive input of a corresponding amplifier 32A-32D. Meanwhile, the source voltage at each driver 28A-28D is fed back into a negative input of the corresponding amplifier 32A-32D. In the arrangement shown, the gate voltages at each driver 28A-28D are provided by outputs of the corresponding amplifier 32A-32D. As a result of the feedback loop, the output of each amplifier 32A-32D minimizes the difference between each target pre-charge voltage and each driver 28A-28D source voltage. This embodiment offers the further advantage of isolating the resistor network from capacitive loading associated with the gate terminals of the drivers 28A-28D.

Figure 7:
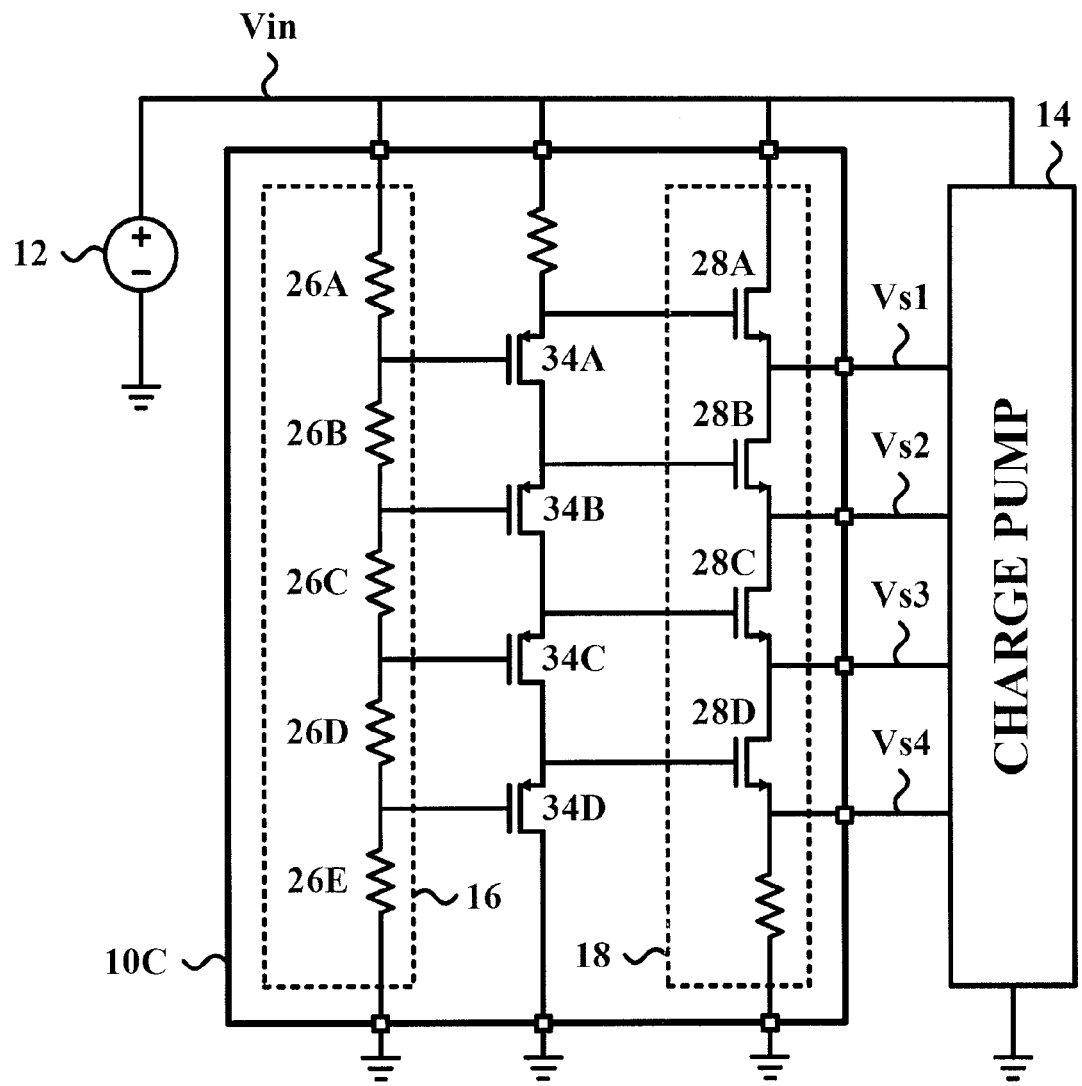
FIG. 7 shows an implementation of the pre-charge circuit with open-loop pre-drivers.

An open loop pre-driver provides another way to achieve a result similar to that achieved by the closed loop pre-driver shown in FIG. 6. In an embodiment using an open loop pre-driver, as illustrated in FIG. 7, the pre-drivers are implemented using PMOS followers 34A-34D. The node between adjacent resistors 26A-26B, 26B-26C, 26C-26D, 26D-26E of the passive voltage divider 16 is connected to the terminal of the corresponding pre-driver 34A-34D. The source terminals of these PMOS followers 34A-34D are connected to the gate terminals of the drivers 28A-28D. This has the effect of raising the voltage provided at the gate terminal of each driver 28A-28D by an amount equal to the drop that would normally be expected between the gate voltage and the source voltage at that driver 28A-28D. As a result, the voltage at the source terminal of the driver 28A-28D is roughly equal to the target pre-charge voltage.

The PMOS followers 34A-34D raise the gate voltage of the drivers 28A-28D, thus offsetting the gate-to-source voltage drop in the NMOS. Their main purpose is to provide a low impedance path to each driver 28A-28D. This reduces the RC time constant and allows the drivers 28A-28D to track more quickly.

Figure 8:
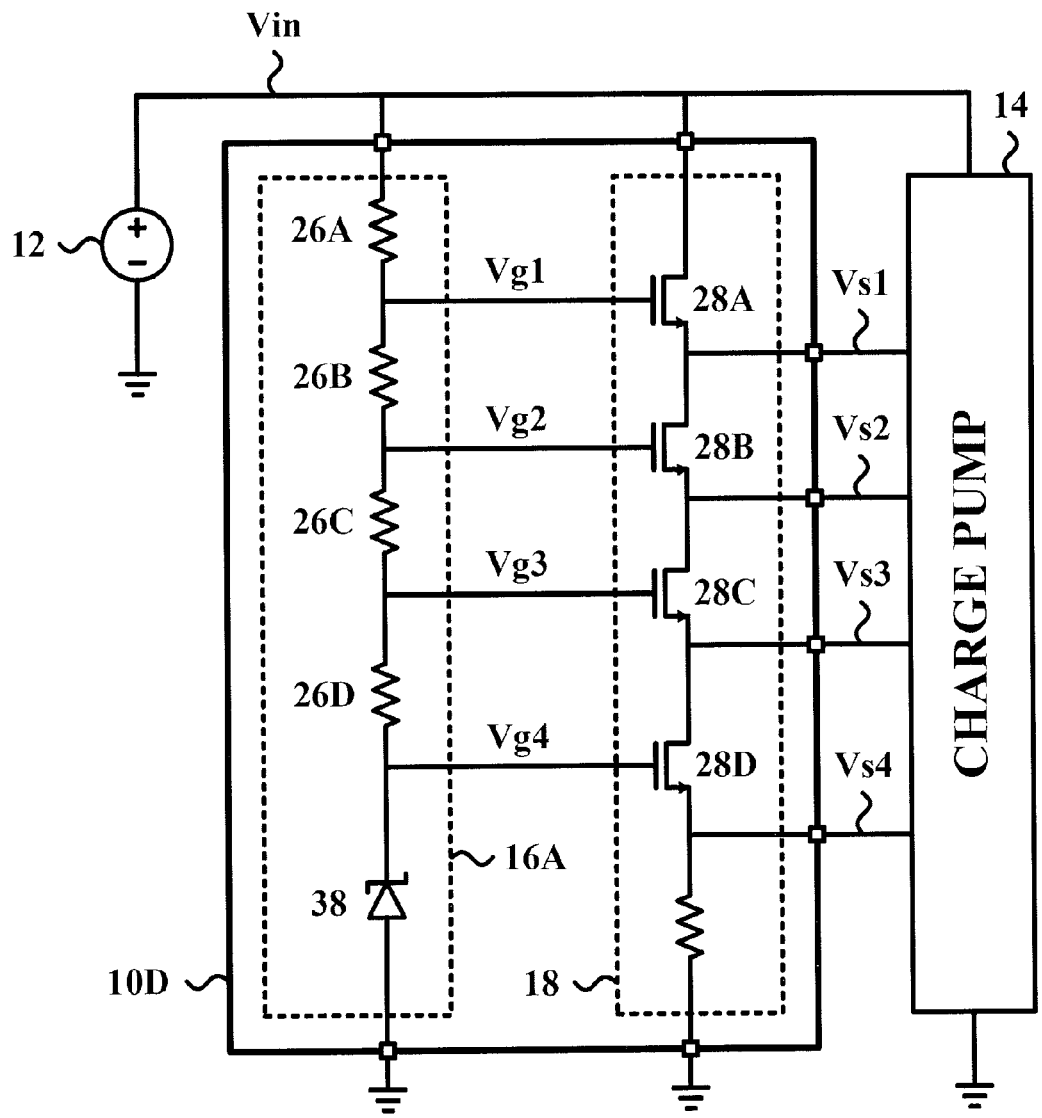
FIG. 8 shows an implementation of the pre-charge circuit with an active voltage divider.

In the preceding embodiments, the passive voltage divider 16 is implemented with resistors. In this instance, the relative spacing's of the target pre-charge voltages are fixed by the resistor network in the passive voltage divider 16. It is sometimes desirable to have the relative spacing's of the target pre-charge voltages to be a function of the input voltage Vin. To achieve this, an active voltage divider 16A is used in the pre-charge circuit 10D instead of the passive voltage divider 16. One possible embodiment with an active voltage divider 16A is shown in FIG. 8, where a Zener diode 38 replaces the fifth resistor 26E in the passive voltage divider 16. Alternatively, an active clamp or a stack of diodes can be used in place of the Zener diode 38.

Figure 9:
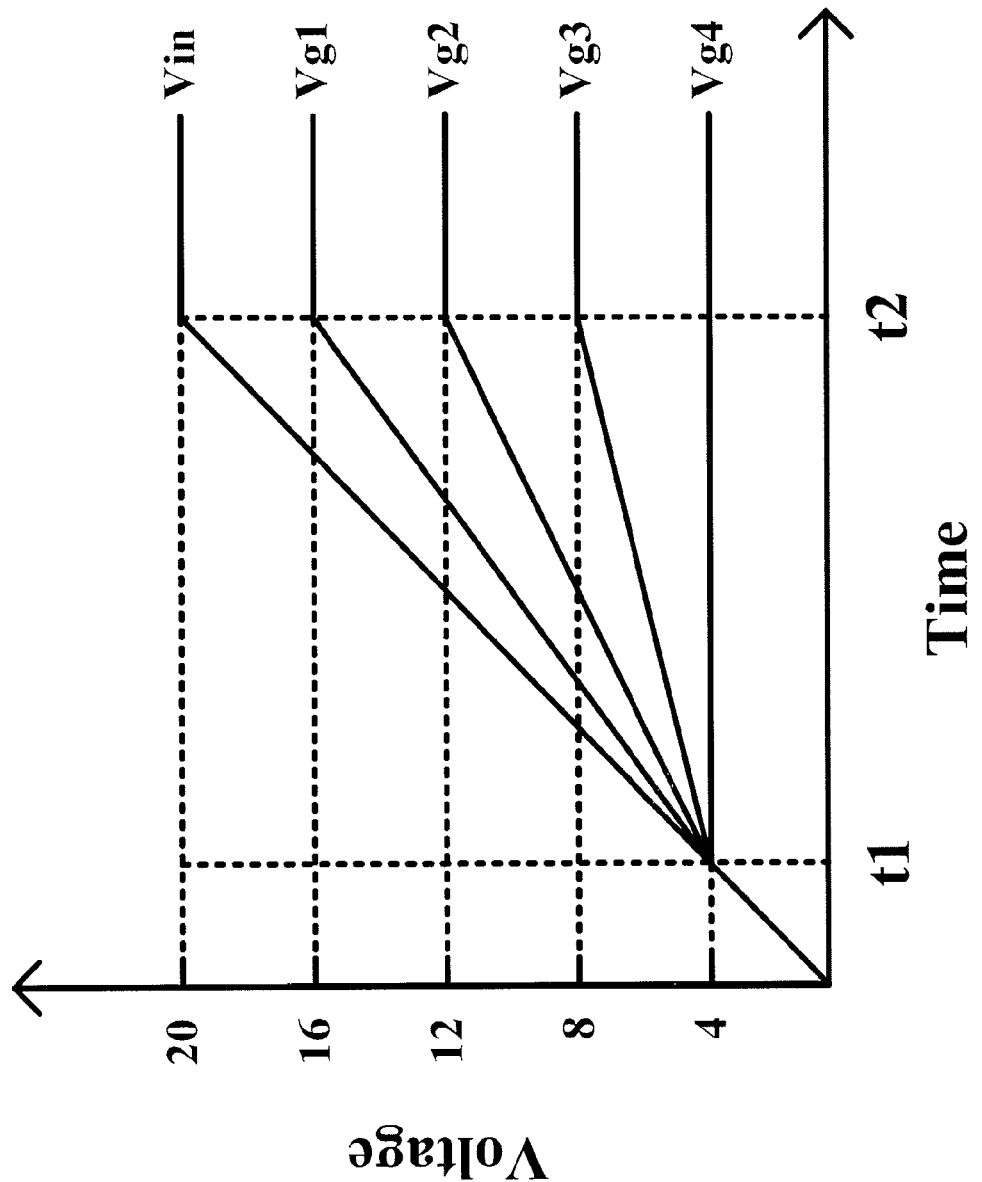
FIG. 9 illustrates the gate voltages at drivers from the pre-charge circuit shown in FIG. 8.

The gate voltages Vg1-Vg generated by the active voltage divider 16A are illustrated in FIG. 9. During the pre-charge mode, there is a ramp-up interval during which the input voltage Vin climbs up to 20 volts. There are two phases of operation during this ramp-up interval. The first phase is that in which the input voltage Vin has not yet climbed above the breakdown voltage of the Zener diode 38. This occurs between time 0 and time t1. The second phase of operation is that in which the input voltage Vin has surpassed the breakdown voltage of the Zener diode 38. This occurs between time t1 and time t2.

In the first phase, while the input voltage Vin is below 4 volts, the Zener diode 38 will present a much higher resistance than the four resistors 26A-26D. As a result, most of the voltage drop will be across the Zener diode 38. Therefore, the gate voltages Vg1-Vg4 presented to the four drivers 28A-28D will tend to be very close to each other. This means that the four pump capacitors 20A-20D within the charge pump 14 will charge at approximately the same rate. This rate is greater than it would have been had the voltage levels been equally spaced, as they were in the embodiment of FIG. 4. In the second phase, the Zener diode 38 breaks down, thus maintaining a 4-volt drop across its terminals. In this phase, the pre-charge circuit 10D operates as described in connection with FIG. 4.

Figure 10:
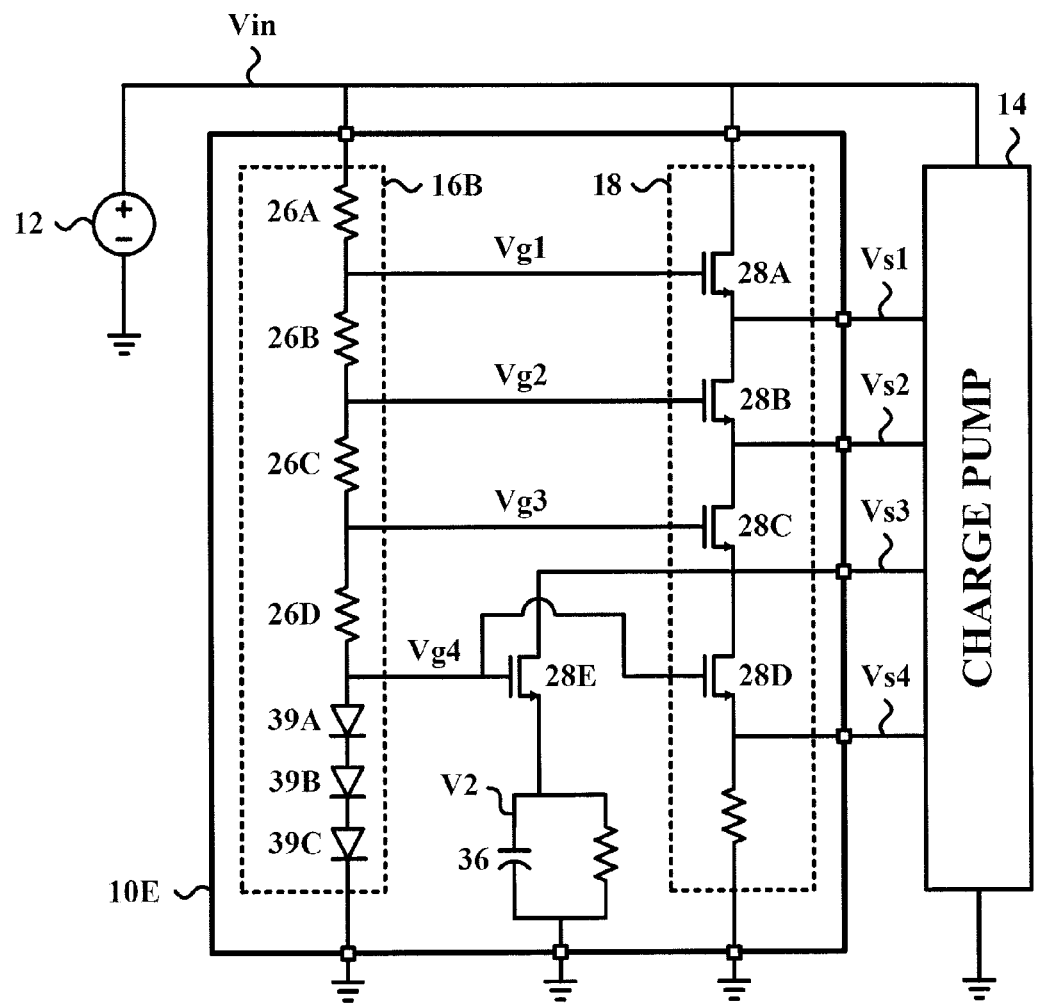
FIG. 10 shows an implementation of the pre-charge circuit adapted to charge an additional output capacitor.

In some cases, it is useful to pre-charge an output capacitor 36 to provide a voltage V2. For example, the output capacitor 36 may be used as a power source for a clock that controls the pump switches 22A-22E. To achieve this, an embodiment shown in FIG. 10 utilizes a pre-charge circuit 10E having an active voltage divider 16B and a fifth driver 28E to pre-charge the output capacitor 36. In this case, the active voltage divider 16B is implemented with stacked resistors 26A-26D and stacked diodes 39A-39C. Alternatively, an active clamp or a Zener diode can be used in place of the stacked diodes 39A-39C. The fifth driver 28E has its gate terminal connected to the same point as the gate terminal of the fourth driver 28D. The illustrated stacked diodes 39A-39C has an equivalent forward voltage at 4 volts, which is consistent with the gap between adjacent voltage levels in the embodiment shown in FIG. 4. The voltage drop of the diode stack can be adjusted by changing the number of diodes in series.

The pre-charge circuit 10E and the pre-charge circuit 10D discussed in connection with FIG. 8 operate in a similar manner. During the pre-charge mode, the pre-charge circuit 10E has two phases of operation as the input voltage Vin ramps up. In the first phase, while the input voltage Vin is below 4 volts, the stacked diodes 39A-39C will present a much higher resistance than the four resistors 26A-26D. As a result, most of the voltage drop will be across the stacked diodes 39A-39C. Therefore, the gate voltages Vg1-Vg5 presented to the five drivers 28A-28E will tend to be very close to each other. This means that the four pump capacitors 20A-20D within the charge pump 14, and the output capacitor 36 will charge at virtually the same rate. In the second phase, the stacked diodes 39A-39C are turned on, thus maintaining a 4-volt drop across the stacked diodes 39A-39C. In this phase, the pre-charge circuit 10E operates as described in connection with FIG. 4.

Although the illustrated charge pump 14 in FIG. 4 is a Dickson charge pump, the various pre-charge circuits 10A-10E described herein can be used with other switched capacitor topologies, including for example a ladder charge pump, series-parallel switched capacitor converters, doubler switched capacitor converters, and cascode multipliers.

Figure 11:
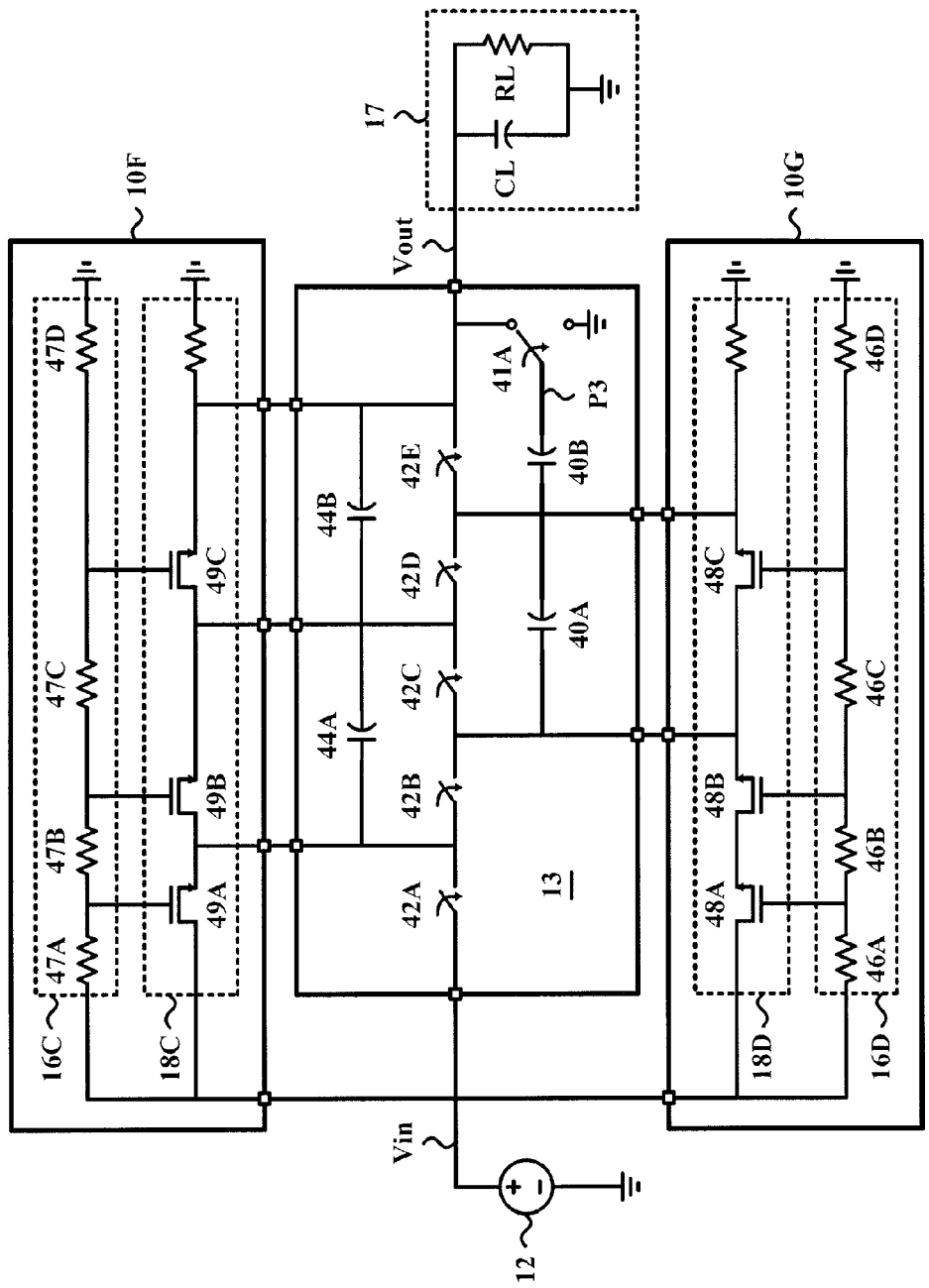
FIG. 11 is a ladder charge pump with a cascoded driver pre-charge circuit.

For example, a ladder charge pump 13 with a 1:3.5 step-down is shown in FIG. 11. For the remaining description of FIG. 11, the charge pump 13 is assumed to be connected to a 14-volt source 12 and to provide 4 volts to a load 17. In the charge pump 13, the pump capacitors 40A-40B are stacked in series with the pump node P3. Additionally, there are dc capacitors 44A-44B in series with the output of the charge pump 13.

The charge pump 13 has two modes of operation: a pre-charge mode and a steady-state operating mode. During the pre-charge mode, an output switch 41A connects the pump node P3 to ground, and the pump switches 42A-42E open. First and second pre-charge circuits 10F, 10G accept an input voltage Vin from a voltage source 12. The first pre-first charge circuit 10F uses the input voltage Vin to pre-charge the dc capacitors 44A-44B and the second pre-charge circuit 10G uses the input voltage Vin to pre-charge the pump capacitors 40B-40C. During the pre-charge mode, both the first and second pre-charge circuits 10F, 10G operate as described in connection with FIG. 4.

By the end of the pre-charge mode, the positive terminals of the pump capacitors 40A, 40B, will have been charged to 8 volts and 4 volts, respectively. Similarly, the positive terminals of the dc capacitors 44A, 44B, and output capacitor CL will have been charged to 12 volts, 8 volts, and 4 volts, respectively. In this case, the output capacitor CL will have been pre-charged as well.

After the pump capacitors 40A-40B and dc capacitors 44A-44B have been charged, the charge pump 13 operates in its steady-state operating mode. During this mode, packages of charge are shuttled along the pump switches 42A-42E as the pump capacitors 40A-40B successively charge and discharge at a specified frequency.

The charge pump 13 transitions between two states. In the first state, the pump node P3 connects to the output of the charge pump 13, pump switches 42A, 42C, 42E open, and pump switches 42B, 42D close. In the second state, the pump node P3 connects to ground, pump switches 42A, 42C, 42E close, and pump switches 42B, 42D open. The maximum voltage stress on any one of the pump switches 42A-42E is the output voltage Vout.

Figure 12:
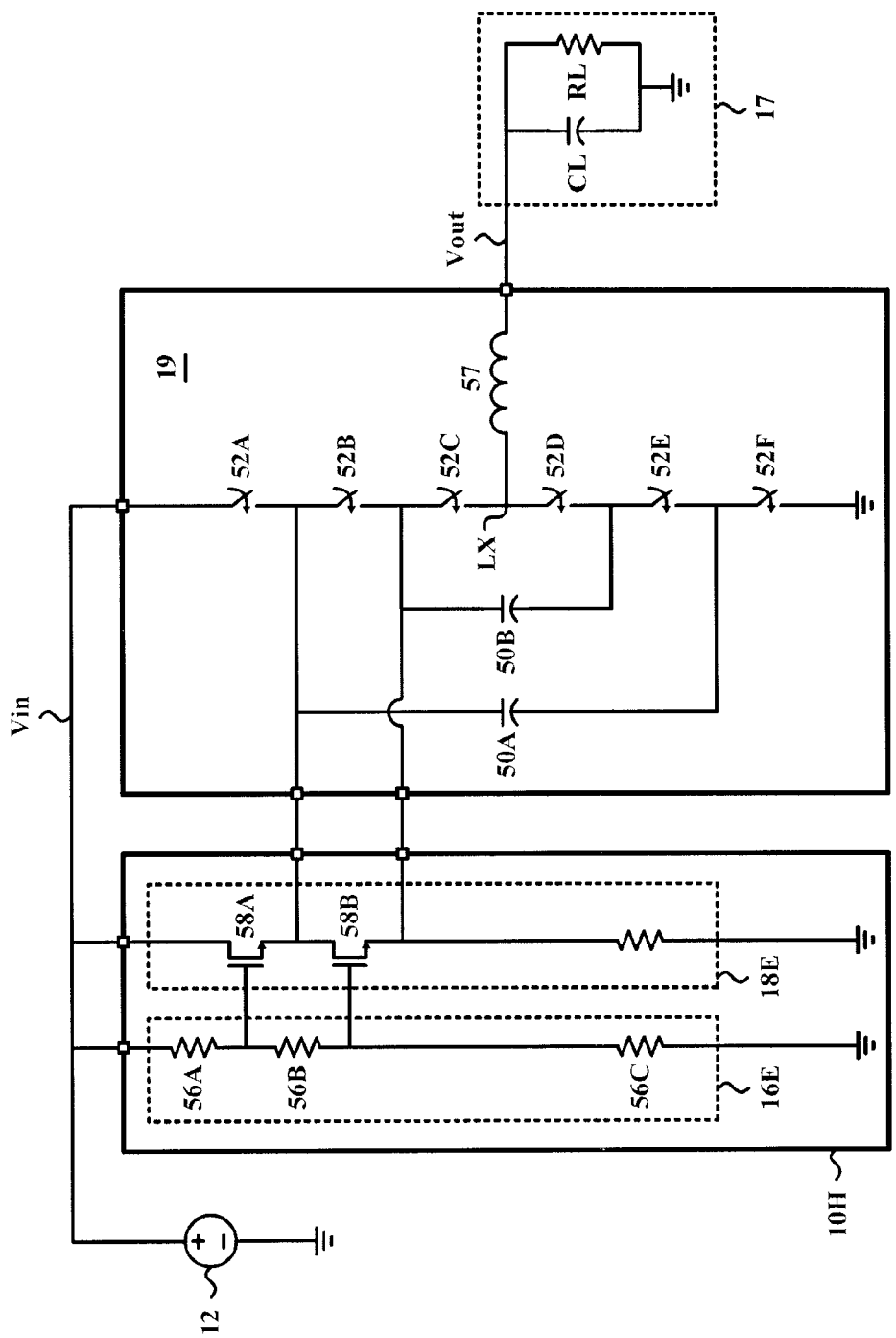
FIG. 12 is a 4-level flying capacitor buck converter with a cascoded driver pre-charge circuit.

The pre-charge circuits 10A-10E described herein can also be used to pre-charge capacitors within traditional switch-mode power converters. An example of a 4-level flying capacitor buck converter 19 with a pre-charge circuit 10H is illustrated in FIG. 12. The multilevel buck converter includes a switched capacitor circuit. In the remaining description of FIG. 12, the multilevel buck converter 19 is assumed to be connected to a 12-volt source 12 and to provide 4 volts to a load 17. Within the multilevel buck converter 19, are six buck switches 52A-52F and two fly capacitors 50A-50B.

The multilevel buck converter 19 has two modes of operation: a pre-charge mode and a steady-state operating mode. During the pre-charge mode, the buck switches 52A-52C are open while the buck switches 52D-52F are closed. The pre-charge circuit 10H accepts an input voltage Vin from a voltage source 12 and uses it to pre-charge the fly capacitors 50A-50B. During the pre-charge mode, the pre-charge circuit 10H operates as described in connection with FIG. 4. At the end of the pre-charge mode, the positive terminals of the fly capacitors 50A, 50B will have been charged to 8 volts, and 4 volts, respectively.

After the fly capacitors 50A-50B are charged, the multi-level buck converter 19 operates in its steady-state operating mode. The input voltage Vin is chopped using the buck switches 52A-52F and the fly capacitors 50A-50B. This results in a pulsating voltage at an inductor node LX. This pulsating voltage is presented to a LC filter represented by a filter inductor 57 and a load capacitor CL, thereby producing an output voltage Vout, which is the average voltage at the inductor node LX.

Figure 13:
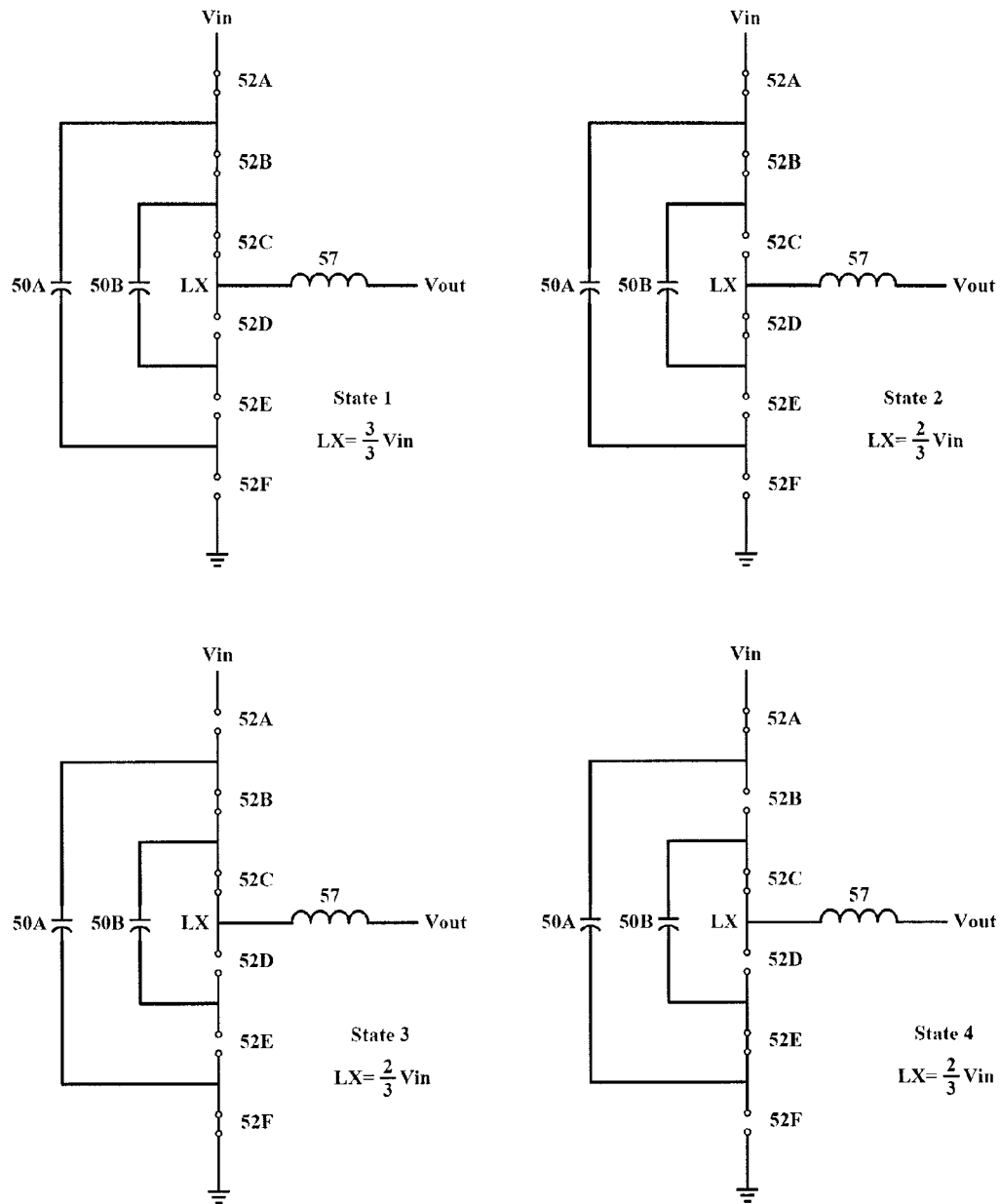
FIG. 13 shows 4 of 8 possible states in the 4-level flying capacitor buck converter of FIG. 12.

The multilevel buck converter 19 is always in one of eight different states. Depending upon the state, the voltage at the inductor node LX is 12 volts, 8 volts, 4 volts, or zero volts, assuming the fly capacitor 50A is charged to 8 volts and the fly capacitor 50B is charged to 4 volts. Four of the eight states are illustrated in FIG. 13. In state 1, the voltage at the inductor node LX is 12 volts where the buck switches 52A-52C are closed and the buck switches 52D-52F are open. Similarly, in states 2, 3, and 4 the voltage at the inductor node LX is 8 volts.

The fly capacitor 50A is charged in state 4 and discharged in state 3 while the fly capacitor 50B is charged in state 2 and discharged in state 4.

The multilevel buck converter 19 alternates between combinations of states depending upon the desired output voltage Vout. For example, if the output voltage Vout is between 12 volts and 8 volts, then the multilevel buck converter 19 will cycle through the following states: 1, 2, 1, 3, 1, 4. Additionally, the duration of time the multilevel buck converter 19 is in each state enables regulation of the output voltage Vout. It is important to note that the multilevel buck converter 19 always operates such that the fly capacitors 50A-50B are charged as much as they are discharged, thus maintaining a constant average voltage across the fly capacitors 50A-50B.

In the preceding embodiments, the pre-charge circuits 10A-10H were all used in conjunction with single switched capacitor circuits. It is sometimes desirable to operate multiple switched capacitor circuits in parallel. In the instances where the clock phases of the individual circuits are run out of phase with each other, these systems often referred to as multi-phase circuits.

Figure 14:
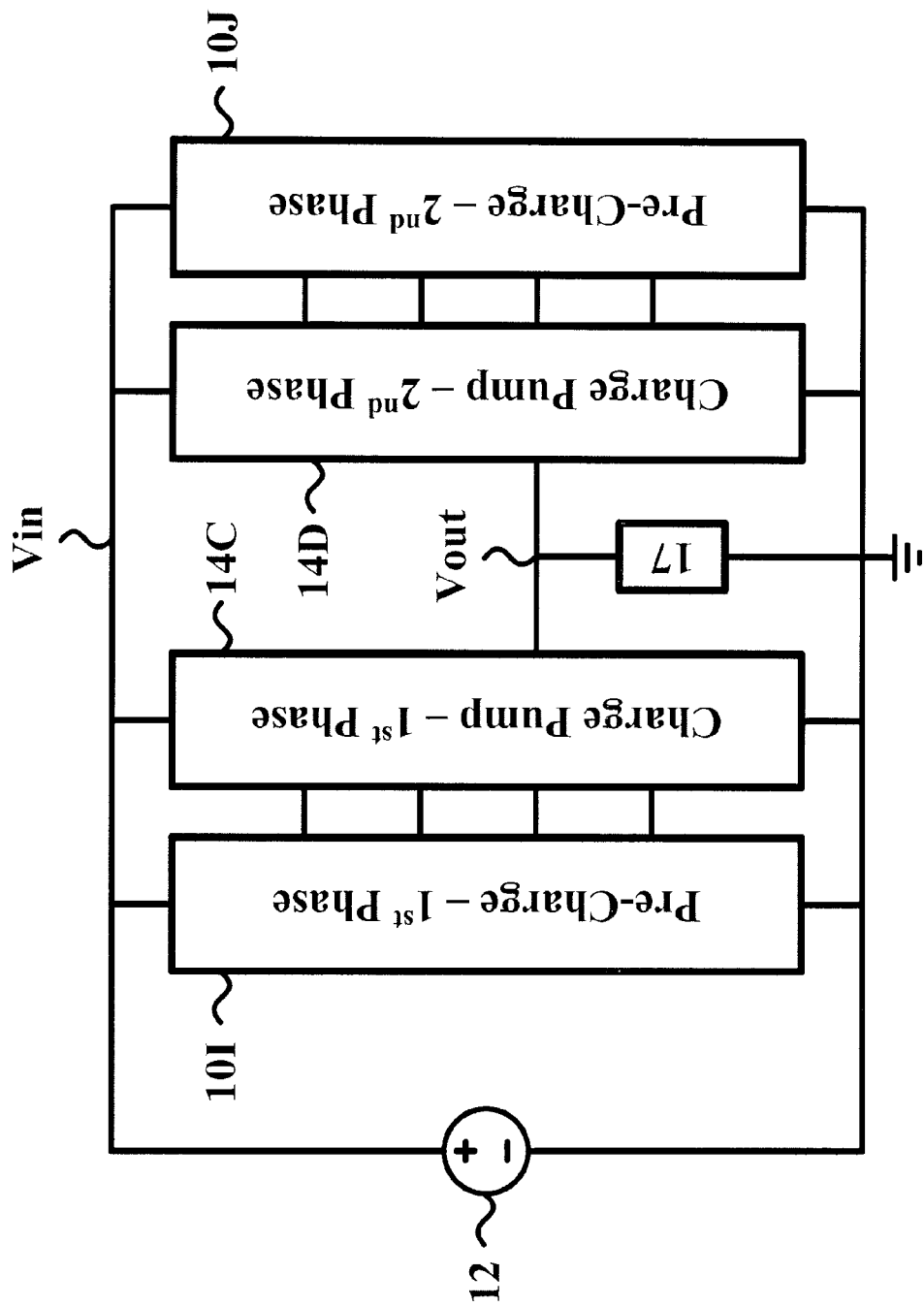
FIG. 14 shows a two-phase charge pump with associated pre-charge circuits.

FIG. 14 illustrates an embodiment in which a two-phase charge pump includes first and second pre-charge circuits 10I, 10J. The first pre-charge circuit 10I uses an input voltage Vin from a voltage source 12 to pre-charge the capacitors within a first phase 14C. The second pre-charge circuit 10J uses the input voltage Vin to pre-charge the capacitors within a second phase 14D. During the pre-charge mode, both the first and second pre-charge circuits 10I, 10J operate as described in connection with FIG. 4.

Having described the invention, and a preferred embodiment thereof, what we claim as new and secured by Letters Patent is:

1. An apparatus for voltage conversion, said apparatus comprising a switched capacitor circuit having pump capacitors, said switched capacitor circuit having a steady-state operating mode and a pre-charge mode, and a pre-charge circuit for initially charging said pump capacitors when said switched capacitor circuit operates in said pre-charge mode, said pre-charge circuit comprising a voltage divider stage having a first node and a second node, wherein said first node provides a voltage at a first level and said second node provides a voltage at a second level and a driver stage having one or more cascoded drivers, each of which comprises a first terminal for receiving a drive signal that depends at least in part on a voltage level at a corresponding one of said nodes, and a second terminal for coupling to a pump capacitor and to another of said drivers.

2. The apparatus of claim 1, wherein said voltage divider stage comprises a pair of adjacent resistors in series, and wherein said first node is defined by said pair of adjacent resistors in series.

3. The apparatus of claim 1, wherein said driver stage comprises a FET.

4. The apparatus of claim 1, wherein said driver stage comprises a BJT.

5. The apparatus of claim 1, wherein said drivers have different current ratings.

6. The apparatus of claim 1, wherein said switched capacitor circuit comprises a Dickson charge pump.

7. The apparatus of claim 5, wherein said drivers comprise pump switches used by said Dickson charge pump during steady-state operating mode.

8. The apparatus of claim 1, wherein said first terminal for receiving a drive signal is connected directly to a node.

9. The apparatus of claim 1, further comprising one or more amplifiers, each having an output connected to a first terminal of a corresponding one of said drivers, a first input connected to a corresponding one of said nodes, and a second input.

10. The apparatus of claim 1, further comprising one or more PMOS followers, each having a source terminal connected to a first terminal of a corresponding one of said drivers, and a gate terminal connected to a corresponding one of said nodes.

11. The apparatus of claim 1, wherein during a first time interval, said voltage divider stage comprises nodes that define a first set of voltage levels, and during a second time interval, said voltage divider stage comprises nodes that define a second set of voltage levels.

12. The apparatus of claim 1, said voltage divider stage comprises one or more resistors in series for dividing a voltage into one or more levels, and a Zener diode in series with said series resistors.

13. The apparatus of claim 1, said voltage divider stage comprises one or more resistors in series for dividing a voltage into one or more levels, and at least one diode in series with said series resistors.

14. The apparatus of claim 1, further comprising an additional switched capacitor circuit and an additional pre-charge circuit, that operate out of phase relative to said switched capacitor circuit and said pre-charge circuit, wherein said additional switched capacitor circuit comprises a switched capacitor circuit having pump capacitors, said switched capacitor circuit having a steady-state operating mode and a pre-charge mode, and wherein said additional pre-charge circuit comprises a voltage divider stage having a first node and a second node, wherein said first node provides a voltage at a first level and said second node provides a voltage at a second level, and a driver stage having one or more cascoded drivers, each of which comprises a first terminal for receiving a drive signal that depends at least in part on a voltage level at a corresponding one of said nodes, and a second terminal for coupling to a pump capacitor and to another of said drivers, wherein said switched capacitor circuit, said pre-charge circuit, said additional switched capacitor circuit, and said additional pre-charge circuit cooperate to deliver energy to a load.

15. The apparatus of claim 1, further comprising an output capacitor connected to said driver stage to be charged during said pre-charge mode concurrently with charging said pump capacitors.

16. The apparatus of claim 15, wherein said output capacitor is disposed such that a rate at which said capacitor charges changes in response to breakdown of a Zener diode in series with said series resistors.

17. An apparatus for providing a voltage, said apparatus comprising a pre-charging circuit, said pre-charging circuit comprising a first stage and a second stage, said first stage comprising at least a first node and a second node, wherein said first node provides a voltage at a first voltage level and said second node provides a voltage at a second voltage level, said second stage comprising a driver set comprising one or more cascoded drivers, wherein at least one driver from said driver set comprising one or more cascoded drivers comprises a first terminal and a second terminal, said first terminal being configured for receiving a drive signal that depends at least in part on a voltage level at a corresponding one of said nodes and said second terminal being configured for coupling to another driver from said set and to a capacitor in a circuit to be pre-charged.

18. The apparatus of claim 17, further comprising a switched capacitor circuit having at least one capacitor, said at least one capacitor being coupled to said second terminal.

19. The apparatus of claim 18, wherein said switched capacitor circuit comprises a Dickson charge pump.

20. The apparatus of claim 17, further comprising a power converter having at least one capacitor, said at least one capacitor being coupled to said second terminal.

21. The apparatus of claim 17, further comprising a multilevel buck converter having at least one capacitor, said at least one capacitor being coupled to said second terminal.

22. The apparatus of claim 17, wherein said first stage comprises one or more resistors in series, and wherein each of said nodes is defined by a pair of adjacent resistors.

23. The apparatus of claim 17, wherein said second stage comprises one or more transistors, each of which has a first terminal, a second terminal, and a third terminal, wherein said first terminal controls current between said second and third terminals, said second terminal being connected to a third terminal of another transistor and to a capacitor to be precharged.

\* \* \* \* \*